United States Patent
Kim et al.

(10) Patent No.: US 7,035,481 B2
(45) Date of Patent: Apr. 25, 2006

(54) APPARATUS AND METHOD FOR LINE INTERPOLATING OF IMAGE SIGNAL

(75) Inventors: Shin-Haeng Kim, Suwon (KR); Yeong-taeg Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 753 days.

(21) Appl. No.: 10/237,935

(22) Filed: Sep. 10, 2002

(65) Prior Publication Data
US 2003/0059126 A1 Mar. 27, 2003

(30) Foreign Application Priority Data
Sep. 24, 2001 (KR) ............. 2001-59106

(51) Int. Cl.
G06K 9/32 (2006.01)
G06K 9/36 (2006.01)

(52) U.S. Cl. .................... 382/300; 382/309
(58) Field of Classification Search ......... 382/300, 382/309, 299; 345/419
See application file for complete search history.

(56) References Cited

U.S. PATENT DOCUMENTS 5,832,143 A * 11/1998 Suga et al. .......... 382/300
6,608,622 B1 * 8/2003 Katayama et al. ...... 345/419
6,928,196 B1 * 8/2005 Bradley et al. ......... 382/300

* cited by examiner

Primary Examiner—Sanjiv Shah
(74) Attorney, Agent, or Firm—Sughrue Mion, PLLC

(57) ABSTRACT

An apparatus and method for interpolating lines of input image signal. The apparatus has a detection unit for detecting a directional characteristic and an angle with respect to a horizontal direction of a sampled edge component obtained by sampling the edge component of an upper horizontal line and a lower horizontal line in an area around a pixel to be interpolated; a judgment unit for judging whether an error is generated based on the directional characteristic and the angle detected by the detection unit and an average value of pixels corresponding to the directional characteristic and the angle; and an image signal generation unit for generating a line interpolated image signal by line interpolating an input image signal, according to a result judged by the judgment unit.

10 Claims, 5 Drawing Sheets

APPARATUS AND METHOD FOR LINE INTERPOLATING OF IMAGE SIGNAL

BACKGROUND OF THE INVENTION

1. Field of the Invention

The present invention relates to an apparatus and a method for interpolating lines of an input image signal, and more particularly, to an apparatus and a method capable of solving problems of a stepwise image or a saw-toothed image at the edge due to a time gap of two fields, when an interlaced scanning image signal formed with two fields is converted to a progressive scanning image signal. The present application is based on Korean Patent Application No. 2001-59106, filed Sep. 24, 2001, which is incorporated herein by reference.

2. Description of the Related Art

When a progressive scanning image signal is generated by extracting one frame image from a motion picture signal of an interlaced scanning video camera, a camcorder, a television, or a VCR (Video Cassette Recorder) having one frame formed with two fields, if the motion picture has a movement due to a time gap between a first field and a second field, or there is a movement in the image due to a hand tremor, then the difference between the fields is significant, and a stepwise image or a saw-toothed image occurs at an edge where the movement is generated.

To reduce the above phenomena, there is a need to interpolate an interlaced scanning image data appropriately via a process known as de-interlacing. There are two ways to interpolate: 1) generating data of one frame by interpolating lines of one field data; and 2) generating data of one frame by using data from more than two fields. Here, the first method of interpolating the lines of the data of one field and generating the data of one frame will be described. Moreover, disclosures in Korean Patent No. 0224859 to the applicant of the present invention will be introduced and a feature which is an improvement on the above Patent will be described.

FIG. 1 is a flow chart showing a conventional method for line interpolating. Referring to FIG. 1, the line interpolating method is comprised of the steps of: an edge component extracting step (S 100); a slope calculating step (S 110); an interpolating step (S 120); and a composition step (S 130). Here, a pixel value of the image signal data (hereinbelow, referred to as 'input data') is referred to as $X_{ref}[i,j]$, and the data generated after being interpolated (hereinbelow, referred to as 'interpolation data') is referred to as $X_{gen}[i,j]$.

In the edge component extracting step (S 100), the edge component of a horizontal direction is extracted from the pixel value of the input data, $X_{ref}[i,j]$. The edge component of the horizontal direction can be obtained by using a horizontal edge extracting filter. The simplest type of filter is a high-pass filter having a horizontal frequency as a center frequency. An edge component value corresponding to the pixel value of the input data is referred to as $E_{ref}[i,j]$. The slope calculating step (S 110) is a step of obtaining a slope of the pixel included in the interpolation data from the edge component value, $E_{ref}[i,j]$, of the input data. This step can be realized with software using an information processing component or with hardware such as a slope detection circuit.

The pixel included in the interpolation data and the input data edge component values around the pixel have a spatial structure shown in FIG. 2. Here, the number of values of edge component data of the input data used in determining slope direction is decided at the discretion of the designer.

In the slope calculating step (S 110), pixels meeting the conditions described below are selected one by one for each of the upper and lower horizontal lines among the pixels included in the input data. First of all, a reference region of the pixel area which is to be interpolated is identified. In this region the pixel of the upper horizontal line having the maximum edge component and the pixel of the lower horizontal line having the maximum edge component are selected. The maximum edge component value of the selected pixel of the upper horizontal scanning line is referred to as $E_{up\_max}[i+d_u, j]$. In addition, the maximum edge component value of the selected pixel of the lower horizontal scanning line is referred to as $E_{down\_max}[i+d_d, j+1]$. Here, '$d_u$' is a horizontal delay between the pixel to be generated of the upper slope and the pixel having the maximum edge component in the upper horizontal scanning line of the reference region. On the other hand, '$d_d$' is a horizontal delay between the pixel to be generated of the lower slope and the pixel having the maximum edge component in the lower horizontal scanning line of the reference region. The value of '$d_u$' increases to the right of FIG. 2, and is positive ('+') to the right of the pixel to be generated and is negative ('−') to the left of the pixel to be generated; the value of '$d_d$' increases to left of FIG. 2, and is positive ('+') to the left of the pixel to be generated and is negative ('−') to the right of the pixel to be generated.

Following is a discussion describing the establishment of two different statuses or states based on criteria related to $E_{up\_max}[i+d_u, j]$ and $E_{down\_max}[i+d_d, j+1]$.

Status 1:

In status 1, all of the five conditions described below are met at the same time.

$$|E_{up\_max}[i+d_u, j] - E_{down\_max}[i+d_d, j+1]| < E_{th} \quad \text{(Condition 1)}$$

This condition means that an absolute value of the difference value of the maximum values of the edge component at the upper and lower horizontal lines is less than the predetermined value '$E_{th}$'.

$$||d_u| - |d_d|| \leq 1 \quad \text{(Condition 2)}$$

The above condition means that a relative position between the pixels to be referred is limited. More specifically, the condition means that the distance between the pixels to be referred should be within the distance of one pixel in a vertical or a diagonal direction.

$$d_u \times d_d < 0 \quad \text{(Condition 3)}$$

This condition means that the pixels to be referred are placed in the diagonal direction, with a pixel to be generated being at the center.

$$E_{up\_max}[i+d_u, j] \geq E_{ref}[i,j] + a \quad \text{(Condition 4)}$$

The condition means that the difference of the edge component between the pixel to be referred and included in the upper horizontal line and the pixel to be referred and placed right above the pixel to be generated should be more than the predetermined value '$a$'.

$$E_{down\_max}[i+d_d, j+1] \geq E_{ref}[i,j] + a \quad \text{(Condition 5)}$$

The above condition means that the difference of the edge component between the pixel to be referred and included in the lower horizontal line and the pixel to the referred and placed right above the pixel to be generated should be more than the predetermined value '$a$'. Here, '$E_{th}$', and '$a$' are constant values, which are appropriately decided by the designer in consideration of the value of the image signal and the frequency band of the image signal.

Status 2:

Status 2 covers all situations other than status 1.

Here, the statuses 1 and 2 are referred to as statuses to be interpolated.

FIG. 3 is a view showing the relation between the statuses to be interpolated (statuses 1 and 2), the pixel to be generated and the pixel to be referred. In the interpolating step (S 120), the value of the pixel to be generated is obtained by a vertical linear interpolation by using the result of the slope calculating step (S 110). The interpolating step (S 120) is performed as follows in accordance with the status to be interpolated.

1) Status 1 (state 1):

The value of the pixel of the image data to be interpolated, $X_{gen}[i,j]$, is $(X_{ref}[i+d_u, j]+X_{ref}[i+d_d, j+1])/2$.

2) Status 2 (state 2):

The value of the pixel of the image data to be interpolated, $X_{gen}[i,j]$ is $(X_{ref}[i,j]+X_{ref}[i,j+1])/2$.

In the composition step (S 130), a frame image is generated by compounding the result of the image generated by the interpolating step (S 120) with the image of the input data.

However, according to the conventional art described so far, when the image has an area of high frequency such as a minute pectinate or lattice pattern, the edge component detected in the horizontal edge detecting step and the slope detecting step of FIG. 1 has some errors. The errors cause the deterioration of the picture since the errors appear as noise in the interpolated screen.

SUMMARY OF THE INVENTION

The present invention has been made to overcome the above-mentioned problems of the related art. Accordingly, it is an object of the present invention to provide an apparatus and a method for line interpolating capable of flawlessly and effectively detecting a slope by using a method for detecting an edge and the slope when spacially interpolating.

The above object is accomplished by an apparatus for line interpolating of an image signal according to the present invention, including: a detection unit for detecting a directional characteristic and an angle with respect to a horizontal direction of a sampled edge component achieved by sampling the edge component of an upper horizontal line and a lower horizontal line in an area around a pixel to be interpolated; a judgment unit for judging whether an error is generated based on the directional characteristic and the angle detected by the detection unit and an average value of pixels corresponding to the directional characteristic and the angle; and an image signal generation unit for generating a line interpolated image signal by line interpolating an input image signal, according to a result judged by the judgment unit.

The detection unit includes a first memory for storing a position of a direction having a minimum value of a difference between the sampled edge component of the upper horizontal line and the lower horizontal line; and a second memory for storing substituted angles consecutively from the substituted angle having a higher correlation, the substituted angles being achieved by substituting a predetermined angle to the sampled edge component.

The judgment unit extracts information about the directional characteristic and the angle, and judges whether: (condition 1) a sign of a value obtained after multiplying the directional characteristic and the angle having the highest correlation is a minus sign; (condition 2) a sign of a value obtained after multiplying the directional characteristic and the angle having the second highest correlation is a minus sign; and (condition 3) a difference between an average value of pixels corresponding to the directional characteristic and the angle having the highest correlation and an average value of pixels corresponding to the directional characteristic and the angle having the second highest correlation is greater than a set-up predetermined value, and the judgment unit judges that an error is generated when the extracted information meets at least one condition among the above conditions.

The image signal generation unit generates an image signal that is line interpolated by the following expression, when the judgment unit judges that the error is generated:

$$X_{(i,j)} = \frac{1}{2}(X_{(i,j-1)} + X_{(i,j+1)})$$

where 'i' and 'j' are coordinate points respectively showing the positions of the pixels on a horizontal line and a vertical line, and $X(i,j)$ is an average value of two pixels vertically adjacent to each other on the upper horizontal line and the lower horizontal line.

The image signal generation unit generates an image signal that is line interpolated by the following expression, when the judgment unit judges that the error is not generated:

$$X_{(i,j)} = \frac{1}{2}(X_{(i+m,j-1)} + X_{(i+n,j+1)})$$

where 'i', and 'j' are coordinate points respectively showing the positions of the pixels on a horizontal line and a vertical line, and $X(i,j)$ is an average value of a value of the pixel at the position having a difference by 'm' from 'j' on the upper horizontal line (the value of the pixel at the position of the highest correlation on the upper line) and a value of the pixel at the position having a difference by 'n' from 'j' on the lower horizontal line (the value of the pixel at the position of the highest correlation on the lower line).

The above object is also accomplished by a method for line interpolating according to the present invention, including the steps of: sampling an edge component of an upper horizontal line and a lower horizontal line in an area around a pixel to be interpolated; detecting a directional characteristic and an angle with respect to a horizontal direction of the sampled edge component; judging whether an error is generated, based on the directional characteristic and the angle detected in the detecting step, and an average value of pixels corresponding to the directional characteristic and the angle; and generating a line interpolated image signal by line interpolating the image signal input according to a result judged in the judging step.

Accordingly, the apparatus for line interpolating of the image signal can flawlessly and effectively detect the slope using the method for detecting the edge and the slope together when spatially interpolating.

BRIEF DESCRIPTION OF THE DRAWINGS

The above-mentioned objects and features of the present invention will be more apparent by describing the preferred embodiment of the present invention by referring to the appended drawings, in which.

DESCRIPTION OF THE PREFERRED EMBODIMENT

Figure 1:
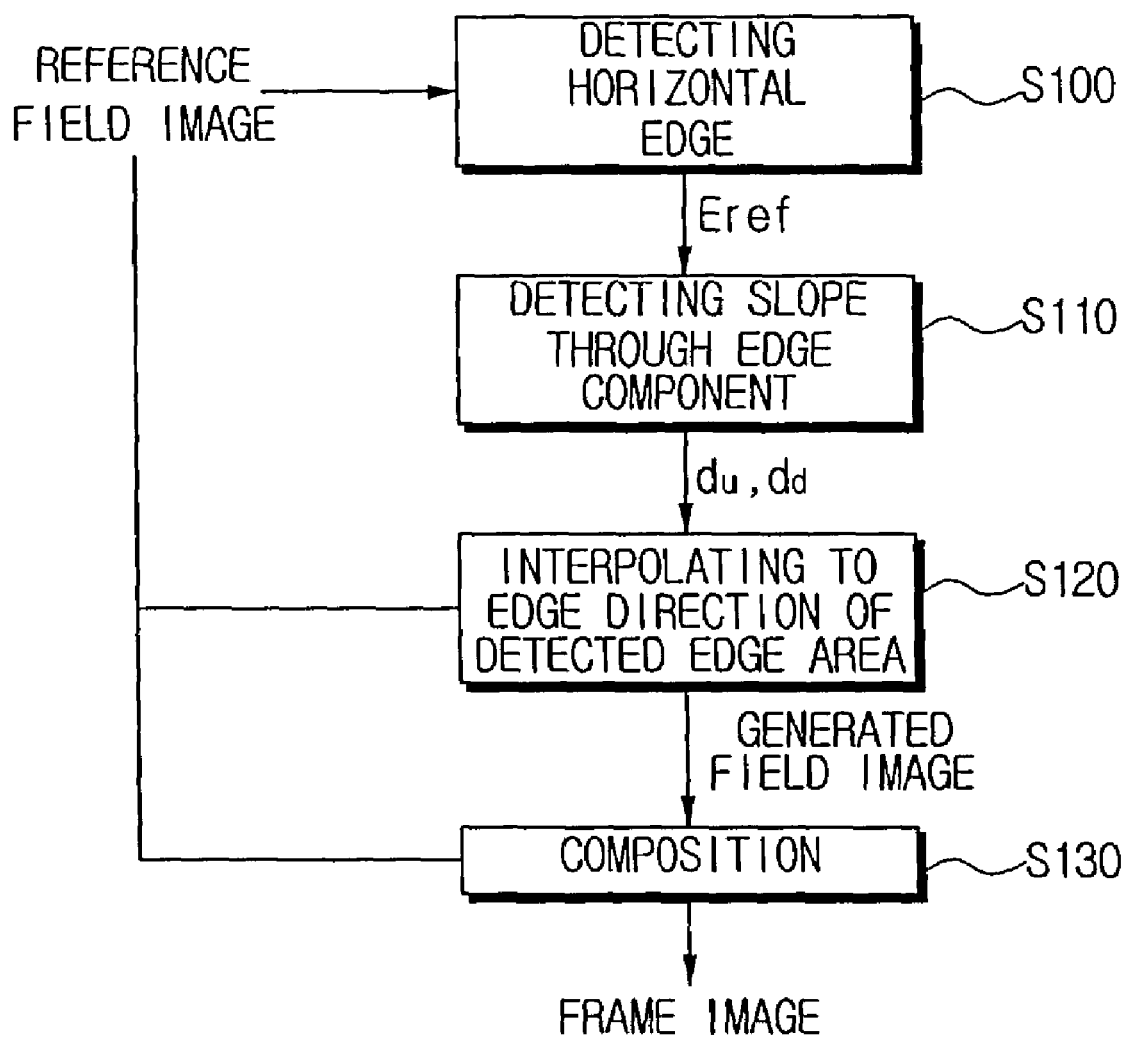
FIG. 1 is a flow chart showing a conventional method for line interpolating.
Figure 2:
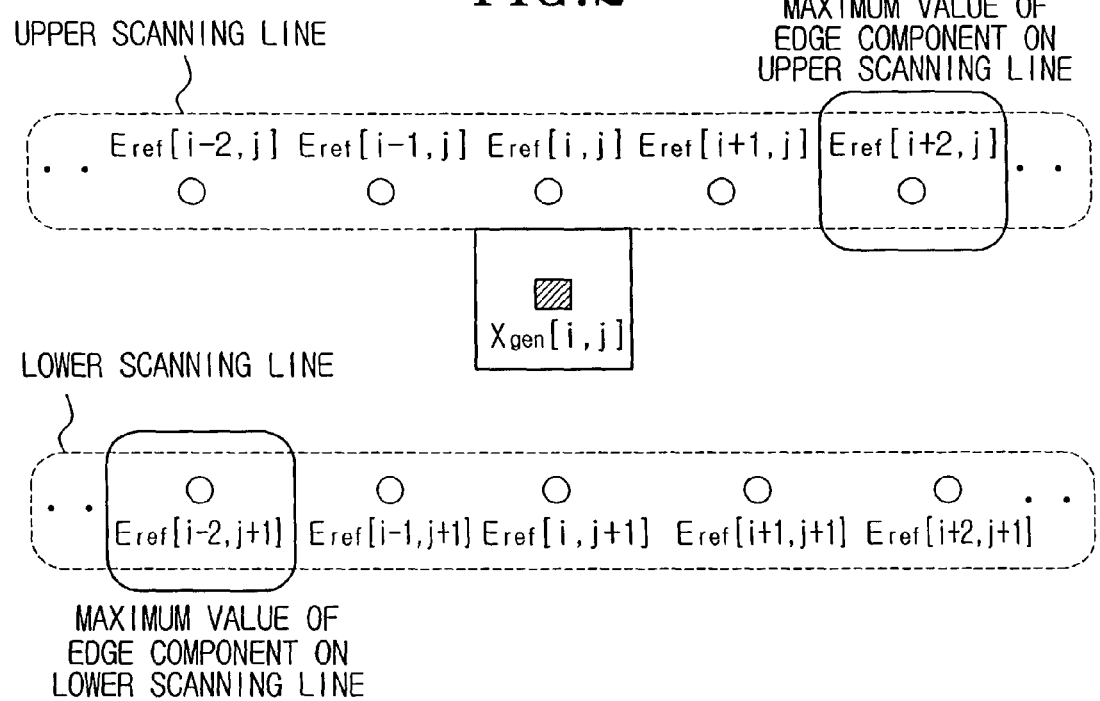
FIG. 2 is a view showing an interpolated pixel and spatial distribution of an edge component value of an image signal around the pixel.
Figure 3:
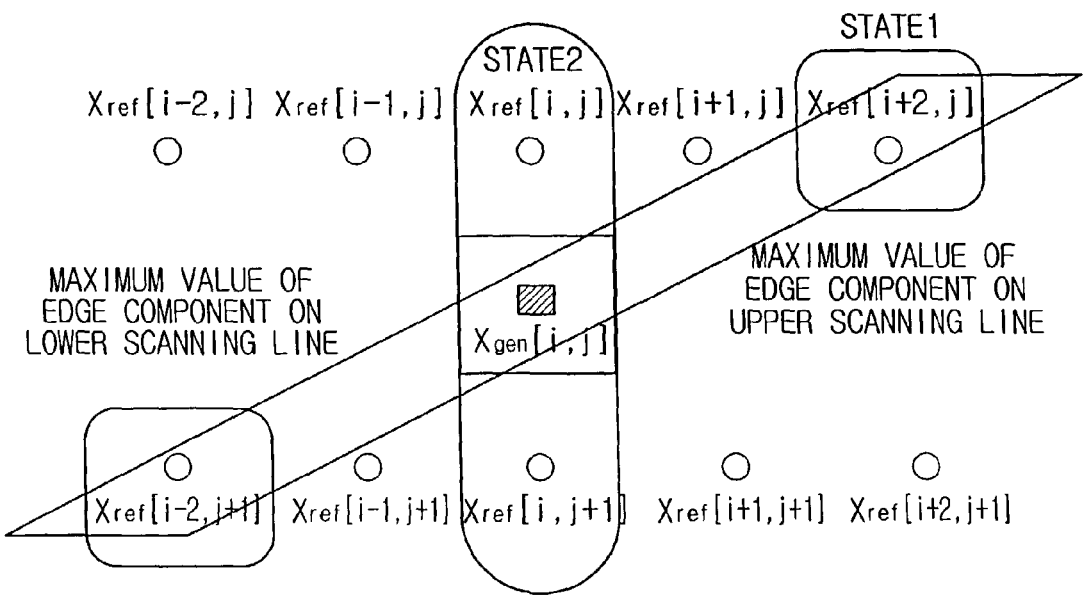
FIG. 3 is a view showing the relation between the pixel to be interpolated and generated and the pixel to be referred.
Figure 4:
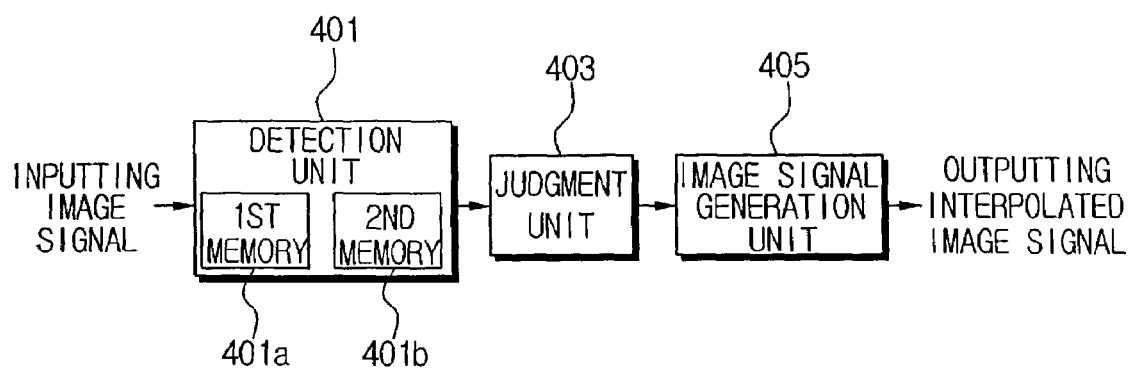
FIG. 4 is a view schematically showing the apparatus for line interpolating of the image signal according to the present invention.

FIG. 4 is a view schematically showing an apparatus for line interpolating of an image signal according to the present invention. The apparatus for line interpolating of an image signal includes a detection unit 401 for detecting a directional characteristic and an angle with respect to a horizontal direction of a sampled edge component achieved by sampling the edge component of an upper horizontal line and a lower horizontal line in an area around a pixel to be interpolated; a judgment unit 403 for judging whether an error is generated based on the directional characteristic and the angle detected by the detection unit 401 and an average value of pixels corresponding to the directional characteristic and the angle; and an image signal generation unit 405 for generating a line interpolated image signal by line interpolating an input image signal, according to a result judged by the judgment unit 403. The detection unit 401 includes: a first memory 401a for storing a position of a direction having a minimum value of a difference between the sampled edge component of the upper horizontal line and the lower horizontal line; and a second memory 401b for storing substituted angles consecutively from the substituted angle having a higher correlation, the substituted angles being achieved by substituting a predetermined angle to the sampled edge component.

Figure 5:
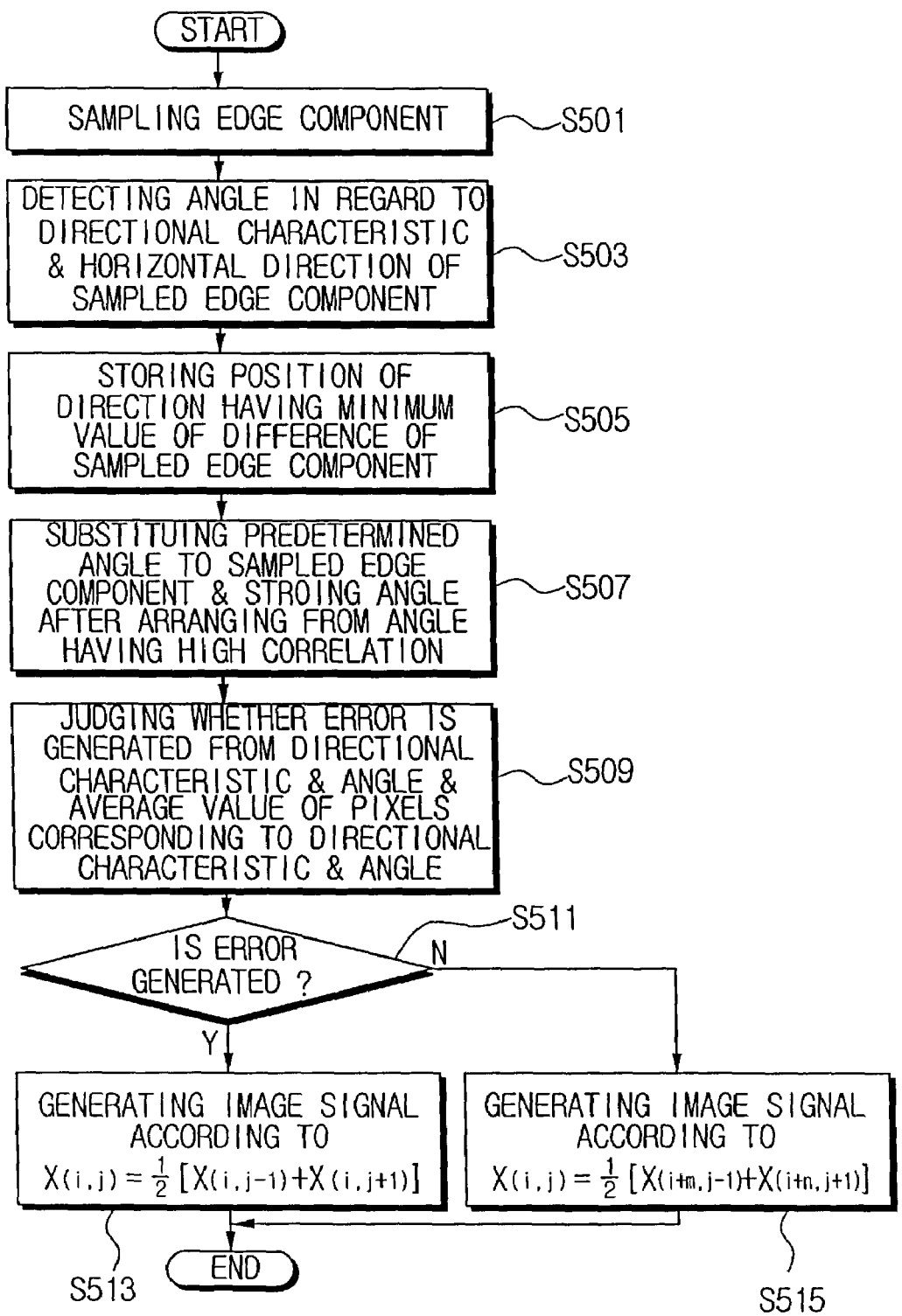
FIG. 5 is a flow chart showing the method for line interpolating by FIG. 4.

FIG. 5 is a flow chart showing a method for line interpolating using the apparatus of FIG. 4. Referring to FIG. 5, the operation of the apparatus for line interpolating will be described, hereinbelow.

The detection unit 401 samples the edge component of the upper horizontal line and the lower horizontal line in the area around the pixel to be interpolated in regard to the input image signal (S 501). Here, a pixel is selected at a regular interval from the upper horizontal line and the lower horizontal line based on the position to be interpolated in the sampling step.

Figure 6:
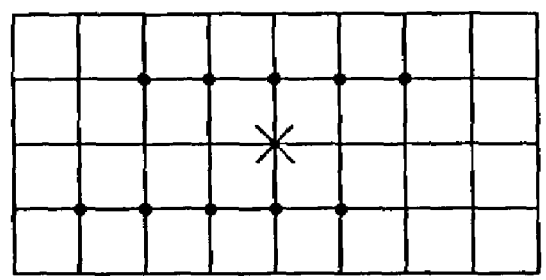
FIG. 6 is a view describing the method for line interpolating by FIG. 4 using a picture.

The detection unit 401 detects the angle in regard to the directional characteristic and the horizontal direction of the sampled edge component. Here, if the position to be interpolated is X(i,j), the direction of the sampled edge component is a direction of a straight line connecting the edge components respectively sampled on the upper horizontal line and the lower horizontal line based on the position to be interpolated. In FIG. 6, five pixels are sampled at regular intervals on the upper horizontal line and the lower horizontal line. Moreover, each of the pixels sampled on the upper horizontal line and the lower horizontal line are sampled at an interval of one space in the horizontal direction and two spaces in the vertical direction. Here, the pixel at the center of the upper horizontal line is expressed as X(i, j−1). In addition, the slope associated with the paired pixels is calculated from the following expression.

$$E_{rl} = \frac{1}{N}\sum_{k=0}^{N-1} |X_{(i-2+k, j-1)} - X_{(i-3+k, j+1)}|$$ [Mathematical expression 3]

where 'N' is the number of pixels sampled on the horizontal line, which, in the described embodiment, is 5.

Yet, the above mathematical expression 3 is not generally used for all sampled pixels. It can be changed according to the position of the sampled pixels. The directional characteristic of the sampled edge component is the directional characteristic of '+' or '−' with respect to the direction having the minimum value of the difference of the paired sampled edge components as determined by the mathematical expression 3.

The detection unit 401 substitutes the predetermined angle for the direction having the minimum value of the difference of the paired sampled edge components, and consecutively arranges the angles in order of correlation to the direction. For example, the angles of 90°, 45° −45° 30°, −30° are set up in advance, and the set-up angles are consecutively substituted for the direction of the edge component. After that, angles are consecutively arranged in order of closeness to the actual angles.

The detection unit 401 stores as a '+' or a '−' the value of the position of the direction having the minimum value of the difference of the sampled edge component into the first memory 401a (S 505). Furthermore, the detection unit 401 substitutes the predetermined angle to the sampled edge component and arranges the angles from one having the high correlation among the substituted angles. Then, the detection unit 401 stores the arranged angles into the second memory 401b (S 507).

The judgment unit 403 extracts the angles arranged by directional characteristic and the correlation stored in the first memory 401a and the second memory 401b. The judgment unit 403 judges whether an error is present based on the directional characteristic and the angle information extracted from the first memory 401a and the second memory 401b and the average value of the pixels corresponding to the directional characteristic and the angle (S 509). In this case, the judgment unit 403 judges whether the following conditions are met by using the angle information and the directional characteristic extracted from the first memory 401a and the second memory 401b, and the average value of the pixels corresponding to the directional characteristic and the angle. When it is judged that one of the following conditions is met, then the judgment unit 403 judges that there is an error.

Condition 1

The sign of the value obtained after multiplying the directional characteristic and the angle having the high correlation is negative, Condition 2 the sign of the value obtained after multiplying the directional characteristic and the angle having the second highest correlation is negative, and Condition 3 whether the difference of the average value of the pixels corresponding to the directional characteristic and the angle having the highest correlation and the average value of the pixels corresponding to the directional characteristic and the angle having the second highest correlation is greater than a predetermined value.

When the judgment unit 403 judges that there is an error (S 511), the image signal generation unit 405 generates the image signal that is line interpolated by the following mathematical expression.

$$X_{(i,j)} = \frac{1}{2}(X_{(i,j-1)} + X_{(i,j+1)})$$ [Mathematical expression 4]

Here, 'i' and 'j' are the coordinate points respectively showing the position of the pixels on the horizontal line and the vertical line. X(i,j) is the average value of two pixels vertically close to each other on the upper horizontal line and the lower horizontal line.

When the judgment unit 403 judges that there are no errors, in other words, one of the above conditions is not met, the image signal generation unit 405 generates the image signal that is line interpolated by the following mathematical expression (S 515).

$$X_{(i,j)} = \frac{1}{2}(X_{(i+m,j-1)} + X_{(i+n,j+1)})$$ [Mathematical expression 5]

Here, 'i' and 'j are the coordinate points respectively showing the position of the pixels on the horizontal line and the vertical line. X(i, j) is the average value of the pixel at the position different by 'm' at 'j' on the upper horizontal line (the value of the pixel at the position of the highest correlation on the upper line) and the pixel at the position different by 'n' at 'j' on the lower horizontal line (the value of the pixel at the position of the highest correlation on the lower line).

Figure 7:
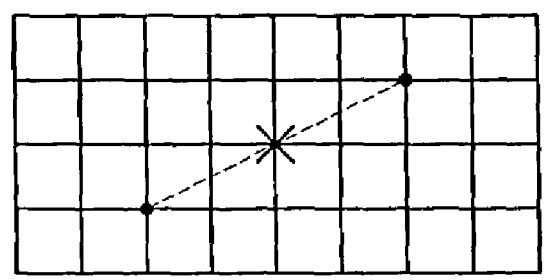
FIG. 7 is a view describing an image signal generated when no error is detected in the method of FIG. 5.

FIG. 7 is a view describing the image signal generated when it is judged that there is no error. For example, when the judgment unit 403 judges that the one of the conditions is not met, and it is judged that the highest correlation is at the predetermined angle at the position of the pixel shown in FIG. 7, then the image signal generation unit 405 generates the image signal interpolated by the following mathematical expression.

$$X_{(i,j)} = \frac{1}{2}(X_{(i+2,j-1)} + X_{(i-2,j+1)})$$ [Mathematical expression 6]

By using the above method, the apparatus for line interpolating of the image signal generates the interpolated image signal, and thus, the quality of the picture can be improved by compensating for the errors generated during the edge component detecting step and the slope detecting step.

Although the preferred embodiment of the present invention has been described, it will be understood by those skilled in the art that the present invention should not be limited to the described preferred embodiment, but various changes and modifications can be made within the spirit and the scope of the present invention. Accordingly, the scope of the present invention is not limited within the described range but the following claims.

What is claimed is:

1. An apparatus for line interpolating an image signal, comprising:

a detection unit for detecting a directional characteristic and an angle with respect to a horizontal direction of a sampled edge component achieved by sampling an edge component of an upper horizontal line and a lower horizontal line in an area around a pixel to be interpolated;

a judgment unit for judging whether an error is generated based on the directional characteristic and the angle detected by the detection unit and an average value of pixels corresponding to the directional characteristic and the angle; and an image signal generation unit for generating a line interpolated image signal by line interpolating an input image signal, according to a result judged by the judgment unit.

2. The apparatus for line interpolating of claim 1, wherein the detection unit comprises:

a first memory for storing a position of a direction having a minimum difference between the sampled edge component of the upper horizontal line and the lower horizontal line; and a second memory for storing substituted angles, the substituted angles being obtained by substituting respective predetermined angles corresponding to sampled edge components, the substituted angles being stored consecutively in order of correlation with the direction.

3. The apparatus for line interpolating of claim 2, wherein the judgment unit extracts information about the directional characteristic and the substituted angles, and judges whether:

a sign of a value obtained after multiplying the directional characteristic and the substituted angle having the highest correlation is a minus sign (condition 1);

a sign of a value obtained after multiplying the directional characteristic and the substituted angle having the second highest correlation is a minus sign (condition 2); and a difference between an average value of pixels corresponding to the directional characteristic and the substituted angle having the highest correlation and an average value of pixels corresponding to the directional characteristic and the substituted angle having the second highest correlation is greater than a predetermined value (condition 3);

wherein the judgment unit judges that an error is generated when the extracted information meets at least one condition among the above condition 1, condition 2 and condition 3.

4. The apparatus for line interpolating of claim 3, wherein the image signal generation unit generates an image signal that is line interpolated by the following expression, when the judgment unit judges that the error is generated:

$$X_{(i,j)} = \frac{1}{2}(X_{(i,j-1)} + X_{(i,j+1)})$$

wherein 'i' and 'j' are coordinate points respectively showing positions of pixels on the horizontal line and a vertical line, and X(i,j) is an average value of two pixels vertically adjacent to each other on the upper horizontal line and the lower horizontal line.

5. The apparatus for line interpolating of claim 3, wherein the image signal generation unit generates an image signal that is line interpolated by the following expression, when the judgment unit judges that the error is not generated:

$$X_{(i,j)} = \frac{1}{2}(X_{(i+m,j-1)} + X_{(i+n,j+1)})$$

where 'i', and 'j' are coordinate points respectively showing positions of pixels on the horizontal line and a vertical line, and X(i,j) is an average value of a value of the pixel at the position having a difference by 'm' from 'j' on the upper horizontal line, that is, the value of the pixel on the upper horizontal line corresponding to the substituted angle of the highest correlation of the upper horizontal line, and a value of the pixel at the position having a difference by 'n' from 'j' on the lower horizontal line, that is, the value of the pixel on the lower horizontal line corresponding to the substituted angle of the highest correlation of the lower horizontal line.

6. A method for line interpolating, comprising the steps of:
   sampling an edge component of an upper horizontal line and a lower horizontal line in an area around a pixel to be interpolated;
   detecting a directional characteristic and an angle with respect to a horizontal direction of the sampled edge component;
   judging whether an error is generated, based on the directional characteristic and the angle detected in the detecting step, and an average value of pixels corresponding to the directional characteristic and the angle; and
   generating a line interpolated image signal by line interpolating the image signal input according to a result judged in the judging step.

7. The method for line interpolating of claim 6, wherein the detecting step includes the steps of:
   storing a position of a direction having a minimum value of a difference between the edge component of the upper horizontal line and the edge component of the lower horizontal line; and
   storing substituted angles consecutively in order of correlation with the direction, the substituted angles being obtained by substituting respective predetermined angles to corresponding sampled edge components.

8. The method for line interpolating of claim 7, wherein the following conditions are judged in the step of judging whether an error is generated:
   whether a sign of a value obtained after multiplying the directional characteristic and the angle having the highest correlation is a minus sign (condition 1);
   whether a sign of a value obtained after multiplying the directional characteristic and the angle having the second highest correlation is a minus sign (condition 2); and
   whether a difference between an average value of pixels corresponding to the directional characteristic and the substituted angle having the highest correlation and an average value of pixels corresponding to the directional characteristic and the substituted angle having the second highest correlation is greater than a predetermined value (condition 3),
   wherein the judgment unit judges that an error is generated when the extracted information meets at least one condition among the above condition 1, condition 2 and condition 3.

9. The method for line interpolating of claim 8, wherein an image signal that is line interpolated by the following expression is generated in the image signal generating step, when it is judged that the error is generated in the step of judging whether an error is generated:

$$X_{(i,j)} = \frac{1}{2}(X_{(i,j-1)} + X_{(i,j+1)})$$

where 'i' and 'j' are coordinate points respectively showing the positions of pixels on the horizontal line and a vertical line, and X(i,j) is an average value of two pixels vertically adjacent to each other on the upper horizontal line and the lower horizontal line.

10. The method for line interpolating of claim 8, wherein an image signal line interpolated by the following expression is generated in the image signal generating step, when it is judged that the error is not generated in the step of judging whether an error is generated:

$$X_{(i,j)} = \frac{1}{2}(X_{(i+m,j-1)} + X_{(i+n,j+1)})$$

where 'i', and 'j' are coordinate points respectively showing positions of pixels on the horizontal line and a vertical line, and X(i,j) is an average value of a value of the pixel at the position having a difference by 'm' from 'j' on the upper horizontal line, that is, the value of the pixel on the upper line corresponding to the substituted angle of the highest correlation of the upper horizontal line, and a value of the pixel at the position having a difference by 'n' from 'j' on the lower horizontal line, that is, the value of the pixel on the lower horizontal line corresponding to the substituted angle of the highest correlation of the lower horizontal line.

* * * * *